United States Patent [19]
Picha

[11] 3,843,280
[45] Oct. 22, 1974

[54] FORAGE BLOWER HOUSING
[75] Inventor: Donald A. Picha, Plainfield, Ill.
[73] Assignee: International Harvester Company, Chicago, Ill.
[22] Filed: Aug. 27, 1973
[21] Appl. No.: 391,910

[52] U.S. Cl.............. 415/219 C, 302/37, 415/206
[51] Int. Cl............................................ F04d 29/48
[58] Field of Search............ 415/201, 219 C, 219 B, 415/206, 204; 302/37; 220/85 SP

[56] References Cited
UNITED STATES PATENTS
| | | | |
|---|---|---|---|
| 1,609,545 | 12/1926 | Hanf.............................. | 415/219 C |
| 1,825,838 | 10/1931 | Wessman.............................. | 302/37 |
| 1,951,269 | 3/1934 | Boeckx et al. .................. | 415/219 B |
| 3,145,063 | 8/1964 | Kools................................... | 302/37 |

*Primary Examiner*—Henry F. Raduazo
*Attorney, Agent, or Firm*—Floyd B. Harman; Dennis K. Sullivan

[57] ABSTRACT

A housing for a forage blower of the type having a peripheral wall comprising a circumferential band and an outlet section in end to end relationship is provided with a housing band which is reversible end for end relative to the blower outlet section, the band being preferably provided with a pair of identical flanges on either end, both of said flanges being capable of completing either a hinged connection to the blower outlet section at one end thereof or a clamped connection to the blower outlet section at the other end.

3 Claims, 5 Drawing Figures

_3,843,280_

FORAGE BLOWER HOUSING

BACKGROUND OF THE INVENTION

This invention relates to forage blowers and more particularly, to a reversible housing band for the impeller housing thereof.

The housing typically used on most forage blowers today comprises a pair of substantially circular side sheets in which a paddled impeller is journalled, one of the side sheets having a crop inlet opening. A peripheral wall is clamped against the outside of the side sheets to enclose the housing, the peripheral wall consisting of a band enclosing most of the housing and a tangential crop outlet section which is hinged or bolted to one end of the band and clamped to the other end. The crop outlet generally discharges the crops vertically, although it may be arranged, due to the clamped connection of the band and the blower outlet against the side sheets, to discharge in any direction in the plane of the impeller.

While this housing arrangement has been found to be quite satisfactory, as attested to by its wide adoption in the industry, it also presents some problems. One of these is that the crops passing through the blower tend to wear out the housing band before any of the other parts, but only in the quadrant directly below the outlet section. This localization of band wear occurs because the crops are usually introduced near the bottom of the housing or in the quadrant just before the bottom and are propelled outwardly against the housing band by the centrifugal force imparted to the crop by the impeller paddles.

SUMMARY OF THE INVENTION

Accordingly, it is a general object of the present invention to make the housing band reversible end for end, thereby enabling the previously worn sections of the band to be moved to an area where it is subjected to little or no wear. In so doing, two benefits accrue. The life of the housing band is considerably extended and the farmer is provided in most cases with a means for accomplishing a quick repair of the blower without the necessity of immediately obtaining a replacement part.

More specifically, it is proposed to provide the housing band with a pair of identical flanges at either end, both of said flanges having the means to complete either the hinged connection to the outlet section or the clamped connection to the outlet section.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary it is intended to cover all alternatives, modifications, and equivalents that may be included within the spirit and scope of the invention as defined by the appended claims.

DETAILED DESCRIPTION OF THE INVENTION

Figure 1:
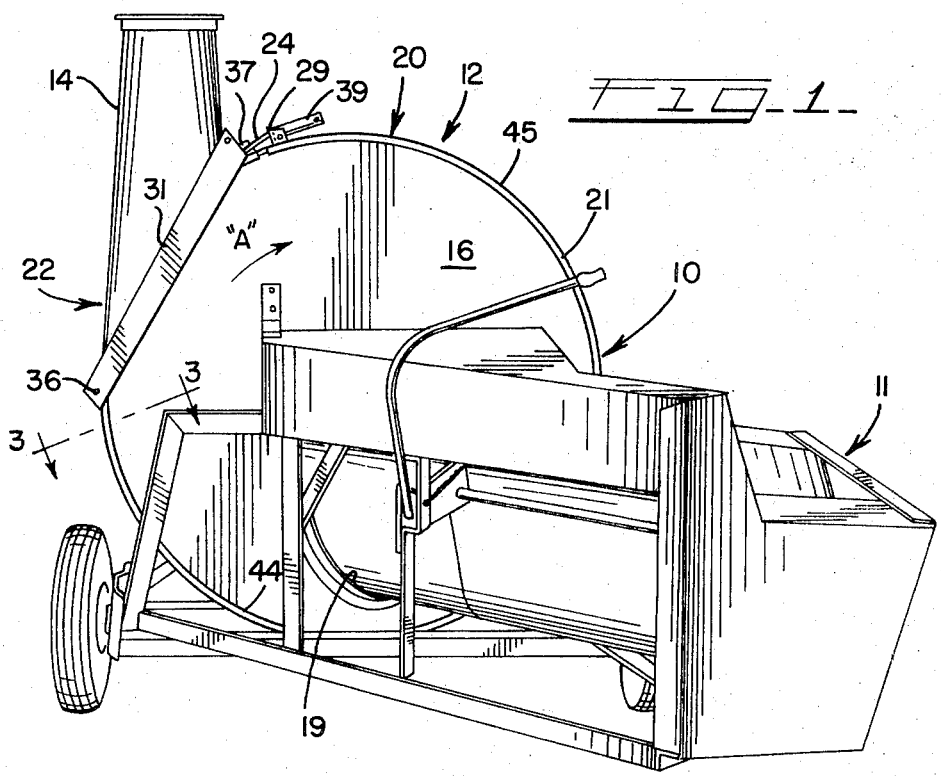
FIG. 1 is a side elevational view of a forage blower incorporating the present invention.
Figure 2:
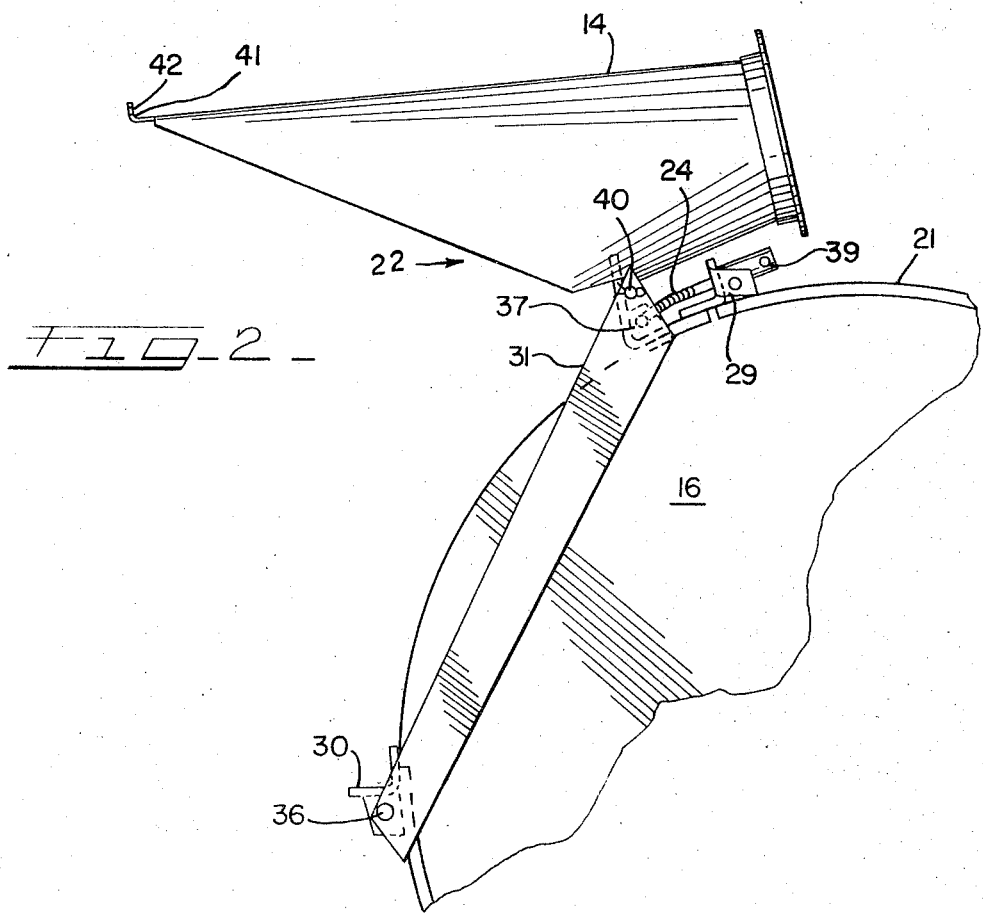
FIG. 2 is an enlarged side view of a portion of the forage blower of FIG. 1 showing the blower outlet displaced from the base member to provide access to the housing interior.

Turning first to FIG. 1, there is shown a forage blower generally designated 10 having a crop receiving receptacle generally designated 11 from which crops are fed into a cylindrical impeller housing generally designated 12 in which an impeller generally designated 13 is journalled. When the impeller is rotated in a direction shown in FIG. 1 as "A" by a suitable source of power, such as a tractor P.T.O., crops fed into the blower from the receptacle 11 are expelled out of the blower outlet 14 and may be propelled, for example, through a tube (not shown) connected to the blower outlet 14 and carried up to the top of a silo. All of the previous structure is quite well known to those skilled in the art and is described merely for the purpose of providing an environment for the invention. For those interested in a complete description of such a blower, reference may be had to U.S. Pat. No. 3,302,978 "Diagonal Feed Material Conveyor and Blower Mechanism," to Thomas J. Scarnato et al., in which a complete description of such a blower is furnished.

The blower housing 12 comprises a pair of laterally spaced vertical substantially circular side sheets 16 and 17, the side sheet 16 having a crop inlet opening 19. An annular peripheral wall 20, which comprises a housing band 21 and a blower outlet assembly 22 connected in end to end relationship, is wrapped about the peripheral edges of the side sheets 16 and 17 and is clamped thereagainst by means of clamp 24, the blower outlet 14 being generally oriented in a vertical position as shown.

Figure 4:
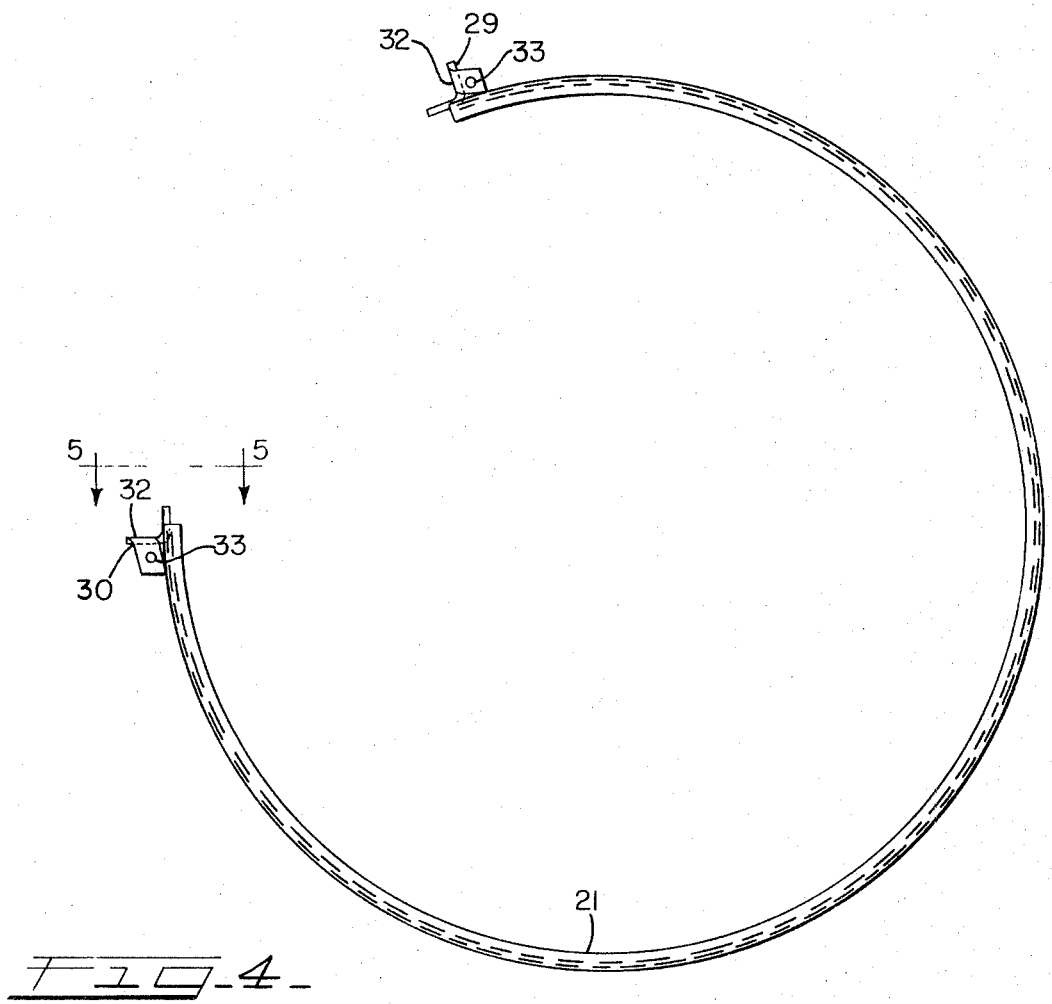
FIG. 4 is a side view of the housing band used in the present invention.
Figure 5:
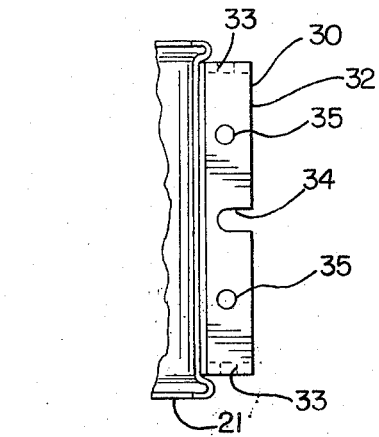
FIG. 5 is an enlarged view of the band flanges shown on the band in FIG. 4 and taken along the line 5—5 thereof.
Figure 3:
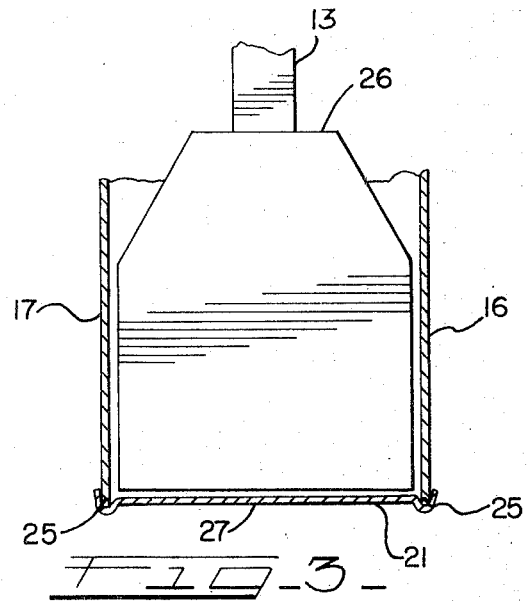
FIG. 3 is a sectional view of the blower shown in FIG. 1 taken along the line 3—3 thereof and illustrating the relationship of the side sheets, housing band, and impeller paddle.

The housing band 21, as best seen in FIGS. 3, 4, and 5, has a pair of grooves 25 receiving the side sheets 16 and 17 to maintain the clearance between the side sheets and the impeller paddles 26. Between the grooves 25, the band 21 has an intermediate portion 27 parallel to and closely spaced to the periphery defined by the paddles 26, the clearance being about one-sixteenth inch at the housing bottom opening to about three thirty-seconds inch on the outlet side in accordance with the art. The housing band 21 is bent into a circular form and has a pair of identical flanges 29 and 30 affixed to each end symmetrically about the gap for connecting the band 21 to the base member 31 of the blower outlet assembly 22. As best seen in FIGS. 4 and 5, the flanges 29 and 30 have a leg 32 radial to the band the ends of which are bent in the longitudinal direction of the band, each end being provided with one of a pair of transverse coaxial holes 33 therein. At the center of the leg 32, the flanges 29 and 30 have a U-shaped opening 34 and a pair of holes 35 disposed on either side thereof with their axes in the longitudinal direction. Since the flanges 29 and 30 are identical, the band may be reversed end for end with respect to the base member 31, thereby enabling the portion of the housing band in the high wear area 44 to be relocated in the low wear area 45.

When the parts are arranged as shown in the drawings, the base member 31 which is U-shaped and has a hole 36 at the distal end of each leg, is pivotally connected to the flange 30 by means of pins or bolts extending through the holes 36 and the holes 33 of the flange 30, thereby forming a hinge therebetween. The opposite end of the base member 31 is provided with a flange 37 which receives one end of the clamp 24. In clamping the base member 31 and band 21 together against the side sheets 16 and 17, the clamp 24 is inserted in the U-shaped opening 34 in the flange 29, the end 39 of the clamp 24 being screwed down until the parts are tightly clamped.

The blower outlet 14 is hinged to the base member 31 by means of a transverse pin 40 extending through suitable holes in the outlet and in the base member 31 above the clamp flange 37 and is free to pivot thereabout. To secure the blower outlet 14 in the closed position, the free end of the blower outlet 14 has an outturned flange 41 which is secured against the clamp 30 by means of bolts (not shown) extending through holes 42 in the flange 41 and the holes 35 in the band flange 30. Thus the blower outlet 14 may be opened for inspection without releasing the clamping on the band 21 by removing the bolts from the holes 42 and 35 and pivotally displacing the blower outlet 14 away from the face member 31 thereby permitting easy access to the interior of the housing 12.

Thus it is apparent that there has been provided, in accordance with the invention, a forage blower housing that fully satisfies the objects, aims, and advantages set forth above.

What is claimed is:

1. In a housing for a forage blower, said housing comprising a pair of laterally spaced generally circular side sheets, one of said side sheets having a crop inlet, and an annular peripheral wall adapted to be clamped against said side sheets, said peripheral wall comprising outlet means and a circumferential band connected in end to end relationship, said band having a first member at one end providing means for attaching said band to one end of said outlet means and a second member at the opposite end providing means for clampingly connecting said band to the other end of said outlet means, the improvement comprising both said first member and said second member providing both said attaching means and said clampingly connecting means to permit the end for end reversal of said band relative to said outlet means.

2. The invention in accordance with claim 1 wherein said means for attaching said band to said one end of said outlet means establishes a pivotal connection therebetween.

3. The invention in accordance with claim 2 wherein said first and second members comprise identical flanges having an opening transverse to said band for establishing said pivotal connection and having an opening in the longitudinal direction adapted to receive complemental clamping means on said outlet means.

* * * * *